United States Patent

[11] 3,598,989

| [72] | Inventor | Orrick H. Biggs<br>Beverly, Mass. |
|---|---|---|
| [21] | Appl. No. | 788,518 |
| [22] | Filed | Jan. 2, 1969 |
| [45] | Patented | Aug. 10, 1971 |
| [73] | Assignee | Sylvania Electric Products Inc. |

[54] AUTOMOTIVE HEADLIGHT
4 Claims, 3 Drawing Figs.

[52] U.S. Cl. .................................................. 240/46.01,
240/41.3, 240/46.51
[51] Int. Cl. .................................................. F21v 11/00
[50] Field of Search ................................. 240/41.3,
41.35, 46.01, 46.51, 41.4; 350/188

[56] References Cited
UNITED STATES PATENTS
3,286,193  11/1966  Koester et al. ................. 350/188
FOREIGN PATENTS
535,057  10/1931  Germany ....................... 240/41.3
594,493  6/1959  Italy .............................. 240/41.3
621,445  6/1961  Italy .............................. 240/41.3

*Primary Examiner*—Samuel S. Matthews
*Assistant Examiner*—Robert P. Greiner
*Attorneys*—Norman J. O'Malley and Laurence Burns ABSTRACT: An automotive headlight having a light source at one focus of an ellipsoid, an aperture at the other focus, the aperture being coated with a rim of glass to diffuse the light near the edges of the aperture. A lens focuses the aperture on the roadway.

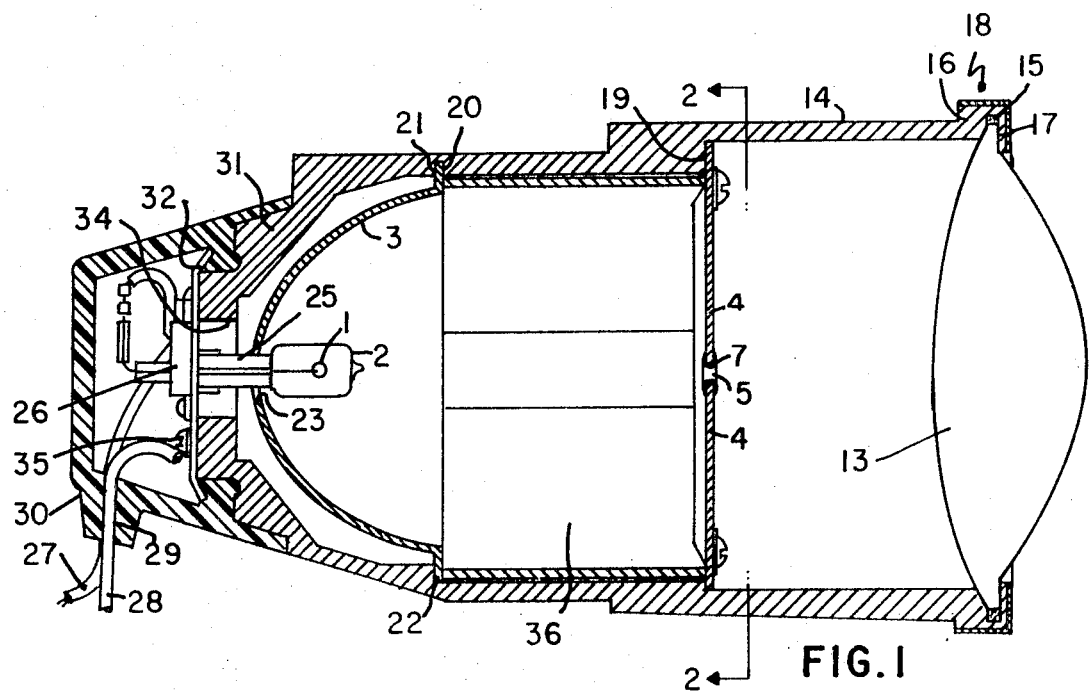
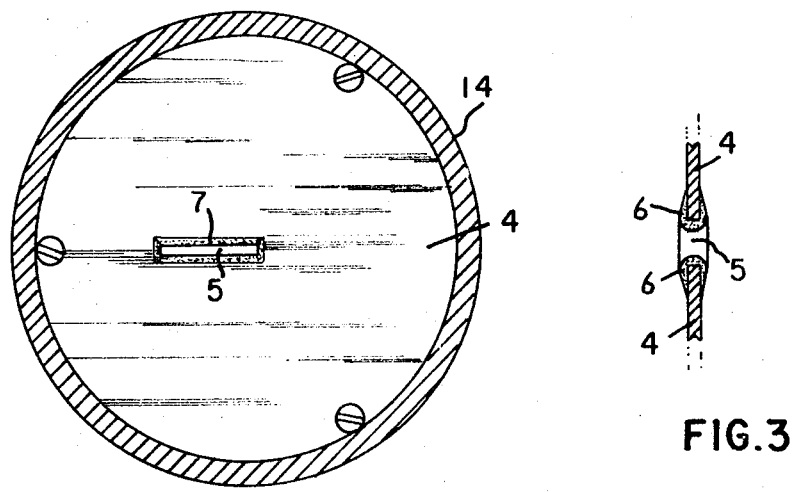
ORRICK H. BIGGS
INVENTOR
BY Lawrence Burns,
ATTORNEY

AUTOMOTIVE HEADLIGHT

FIELD OF THE INVENTION

This invention relates to lights of a type which can be used on motor vehicles for illuminating a roadway, although the lights can also be used for other purposes In particular, they are designed to throw a sharply defined beam down onto the roadway, with very little upward light, and this can be accomplished by a high-intensity light source set near one focus of an ellipsoid, with an aperture called a "gate" near the other focus, the illuminated aperture being focused onto the road by a lens. Other optical systems of a projection type can be used.

SUMMARY OF PRIOR ART

Such lighting is very effective, but the sharpness of the outline of the aperture appears to accentuate the chromatic aberration in the lens so that there is some blue color produced around the perimeter of the beam. This is found to be undesirable in many cases, and may result in an ordinary car's being mistaken for a police car, which may cause confusion.

BRIEF SUMMARY OF INVENTION

I find that the blue color can be greatly reduced or even substantially eliminated by coating the edges of the aperture with glass, which can be applied as a frit and then fused to the metal of the gate at the aperture. Although I do not wish to be limited to any particular theory, I believe that the effectiveness of this is due to the fact that the presence of the glass in effect removes the sharpness of the aperture by refracting the rays in a variety of directions and eliminating the diffraction pattern otherwise present at the sharp edge. The glass coating is rounded in cross section and does not itself present a sharp edge so there is no interference pattern. The light in the aperture between the glass coatings at opposite edges passes through without hindrance.

The resultant beam is not only white throughout but in addition has smooth edges with a somewhat less abrupt transition, which is advantageous, since a person who comes in the path of the beam, say on a right turn going uphill, will not have to undergo such a sudden change from darkness to bright light.

BRIEF DESCRIPTION OF DRAWINGS

Other objects, features, and advantages of the invention will be approved from the following specification taken in connection with the accompanying drawing, in which:

FIG. 1 is a longitudinal section of one embodiment of a headlamp according to the invention;

FIG. 2 is a transverse cross section on line 1–1;

FIG. 3 is an enlarged cross section of the aperture disk or gate showing in detail the coating applied over the edge of the opening.

DESCRIPTION OF SPECIFIC EMBODIMENT

In FIG. 1, the coiled filament 1 in lamp bulb 2 is at or near the first focus of ellipsoidal reflector 3, and the aperture disk 4, often called a gate is set with the aperture or opening 5 at or near the second focus of the ellipsoid through which light from the reflector can pass.

The glass frit 6 is fused around the long edges 7 of the aperture 5, and can also be used around the short edges 8, if desired. The glass frit 6 should be of a kind capable of forming a permanent seal with the metal of the apertured disk 4. Various combinations of metals and glass which make permanent seals are well known in the art. Instead of being permanently sealed, the glass 6 can be formed to fit over the edge 7 and held by the tightness of the fit or by other means, but a permanent seal will prevent loosening under road conditions.

A lens 13 is affixed to a housing canister 14 by the cement 15 around its rim 16 which is set into a circumferential groove 17 just inside the end 18 of the canister, which end 18 would be open except for the lens 13. The lens 13 has its rear focus at or near the gate 4, and projects a beam forwardly toward infinity. The housing canister 14 has a step 19 around its inside circumference, in the plane of the gate 4, against which the gate can be set and held. The step 19 can be deeper at the top of the canister 14 than at the bottom.

The ellipsoidal reflector 3 has the flanged rim 20 which sets into an internal groove 21 at the top of the canister 14 and sets against a step 22 at the bottom of said canister. The reflector 3 has the opening 23 at its apex, through which the lamp 2, which carries coiled filament 1, is inserted. The lamp 2 has the pressed seal type of base 25, which fits into a socket 26, from which insulated lead-in wires 27, 28 emerge through openings 29 in a rubber cup, or "boot" 30 held to the closed end 31 of canister 14 by the metal disc 32 which bears against the internal annular ring 33 of boot 30. The disc 30 is held to close the opening 34 in end 31 by screw 35. A metal cylinder 36 spaces the open end of reflector 3 from gate 4.

The constructional details of the canister and boot are shown in the copending application Ser. No. 758,328 of Hough and Dayton for an automotive driving light, filed Sept. 9, 1968. The lens is described in copending application Ser. No. 694,526 filed Dec. 29, 1967 for Automobile Headlights by Robert E. Levin. The lamp 2 is described in application Ser. No. 680,855, filed Nov. 6, 1967, by John J. Vetere for an Automotive Lamp.

Although a specific embodiment of the invention has been described herein, various modifications will be apparent to a person skilled in the art, without departing from the spirit and scope of the invention, which is defined by the claims.

What I claim is:

1. A vehicle light comprising a light source, a gate having an aperture in front of said source, an optical system for projecting an image of said source near said aperture, the light from said image passing through said aperture, a lens in front of said aperture and having its rear focus near said image for projecting a beam and a refracting material around at least one edge of said aperture in a rounded cross section to diminish diffraction and make the edges of the beam white.

2. A vehicle light as in claim 1, in which the refracting material is present as a coating around the edge of the aperture.

3. A vehicle light as in claim 1, in which the refracting material is glass.

4. The vehicle light as in claim 2, in which the optical system comprises a portion of an ellipsoid having a rear focus and a forward focus, a source of light at the rear focus and the gate at the forward focus.